(12) United States Patent
Amrany et al.

(10) Patent No.: US 6,999,504 B1
(45) Date of Patent: Feb. 14, 2006

(54) SYSTEM AND METHOD FOR CANCELING CROSSTALK

(75) Inventors: Daniel Amrany, Wayside, NJ (US); Patrick Duvaut, Tinton Falls, NJ (US); William Keasler, Tinton Falls, NJ (US); Laurent Pierrugues, Tinton Falls, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 1095 days.

(21) Appl. No.: 09/808,760

(22) Filed: Mar. 15, 2001

Related U.S. Application Data (60) Provisional application No. 60/252,250, filed on Nov. 21, 2000.

(51) Int. Cl.
  *H04B 1/38* (2006.01)
  *H04L 5/16* (2006.01)
(52) U.S. Cl. ...................... 375/222; 370/201
(58) Field of Classification Search ............... 375/222, 375/346, 258
  See application file for complete search history.

(56) References Cited

U.S. PATENT DOCUMENTS

| | | | | |
|---|---|---|---|---|
| 4,283,604 A | * | 8/1981 | Chambers, Jr. ............. | 379/413 |
| 4,479,258 A | * | 10/1984 | Namiki ....................... | 455/295 |
| 5,063,351 A | | 11/1991 | Goldthorp et al. .......... | 324/628 |
| 5,235,617 A | * | 8/1993 | Mallard, Jr. ................ | 375/288 |
| 5,295,159 A | * | 3/1994 | Kerpez ....................... | 375/260 |
| 5,315,175 A | * | 5/1994 | Langner ...................... | 326/21 |
| 5,483,551 A | | 1/1996 | Huang et al. ................ | 375/219 |
| 5,740,256 A | | 4/1998 | Castello Da Costa et al. ........................ | 361/94.7 |
| 5,822,426 A | * | 10/1998 | Rasmus et al. ............. | 379/402 |
| 5,887,032 A | | 3/1999 | Cioffi ......................... | 375/257 |
| 5,991,311 A | | 11/1999 | Long et al. .................. | 370/524 |
| 6,011,814 A | | 1/2000 | Martinez et al. ............ | 375/233 |

(Continued)

OTHER PUBLICATIONS

"Multi-line crosstalk and common-mode noise analysis" Deutsch, A.; Smith, H.H.; Kopcsay, G.V.; Krauter, B.L.; Surovic, C.W.; Coteus, P.W.; Electrical Performance of Electronic Packaging, 2000, IEEE Conference on. Oct. 23-25, 2000 Page(s):317-320.*

(Continued)

*Primary Examiner*—Stephen Chin
*Assistant Examiner*—Harry Vartanian
(74) *Attorney, Agent, or Firm*—Thomas, Kayden, Horstemeyer & RIsley (57) ABSTRACT

A method and apparatus are disclosed for reducing crosstalk in a telecommunication system. Broadly, the present invention utilizes a common mode signal to obtain additional information that can be used to better approximate the transmitted signal (by approximating and canceling crosstalk or otherwise). In accordance with one embodiment of the invention, a modem is provided having improved crosstalk cancellation circuitry for canceling crosstalk received on a local loop (or otherwise estimating the remotely transmitted signal) carrying modem communications. The modem includes a first input for receiving a signal carried on the local loop and a second input for receiving a signal obtained from the common mode. The modem further includes processing circuitry configured to either reduce crosstalk present in the signal carried on the local loop, or to otherwise closely approximate the remotely transmitted signal. Using both the first and second signals allows the processing circuitry of the modem to obtain more accurate results.

29 Claims, 9 Drawing Sheets

U.S. PATENT DOCUMENTS

| | | | | |
|---|---|---|---|---|
| 6,018,317 | A | | 1/2000 | Dogan et al. ................ 342/378 |
| 6,021,167 | A | | 2/2000 | Wu ............................ 375/354 |
| 6,044,107 | A | | 3/2000 | Gatherer et al. ............ 375/222 |
| 6,052,420 | A | * | 4/2000 | Yeap et al. ................. 375/346 |
| 6,055,297 | A | | 4/2000 | Terry ............................. 379/1 |
| 6,069,922 | A | | 5/2000 | Dyke ......................... 375/285 |
| 6,128,349 | A | | 10/2000 | Chow ......................... 375/260 |
| 6,137,839 | A | | 10/2000 | Mannering et al. ......... 375/260 |
| 6,144,695 | A | | 11/2000 | Helms et al. ............... 375/222 |
| 6,144,696 | A | | 11/2000 | Shively et al. .............. 375/222 |
| 6,167,417 | A | | 12/2000 | Parra et al. ................. 708/405 |
| 6,226,330 | B1 | * | 5/2001 | Mansur ....................... 375/257 |
| 6,456,673 | B1 | * | 9/2002 | Wiese et al. ................ 375/346 |
| 6,507,620 | B1 | * | 1/2003 | Usui ........................... 375/257 |
| 6,510,184 | B1 | * | 1/2003 | Okamura .................... 375/260 |
| 6,538,510 | B1 | * | 3/2003 | Amrany et al. ............. 330/252 |
| 6,683,913 | B1 | * | 1/2004 | Kantschuk .................. 375/258 |
| 6,744,811 | B1 | * | 6/2004 | Kantschuk .................. 375/222 |

OTHER PUBLICATIONS

A measurement of balanced transmission lines using S-parameters Yanagawa, K.; Yamanaka, K.; Furukawa, T.; Ishihara, A.; Instrumentation and Measurement Technology Conference, 1994. Advanced Technologies I & M., 1994 IEEE May 10-12, 1994 Page(s):866 vol 2.*

Kim et al., "The Derivation of a New Blind Equalization Algorithm," ETRI Journal, vol. 18, No. 2, Jul., 1996, pp. 53-60.

Rudberg et al., "Crosstalk Cancellation in DMT Communication Systems," Ericsson Components AB, 164 81 Kista, Sweden, pp. 1-4.

Clarke et al., "A New Analytical Method for NEXT and FEXT Noise Calculation," ANSI Standards Committee T1E1.4/98-189, pp. 1-6.

Michael Schlegel, "The Loop Plant," (Matr.-Nr. 593 618), www.fh-lippe.de/~wayne1/chapter2.html, pp. 1-55.

Jim Lane, "Personal Broadband Services: DSL and ATM," Virata, 1998, pp. 1-96.

Tretter et al., "V.34 Transmitter and Receiver Implementation on the TMS320C50 DSP," Digital Signal Processign Solutions, Jun., 1977, SPRA159, pp. 1-B-4.

* cited by examiner

SYSTEM AND METHOD FOR CANCELING CROSSTALK

CROSS-REFERENCE TO RELATED APPLICATIONS

This application claims the benefit of U.S. Provisional Patent Application Ser. No. 60/252,250, filed on Nov. 21, 2000, and entitled "NEXT and FEXT Cancellation Based on the Common Mode as a Secondary Sensor," which is hereby incorporated by reference.

BACKGROUND OF THE INVENTION

1. Field of the Invention

The present invention generally relates to communication systems, and more particularly, to a system and method for to canceling crosstalk in a communications system.

2. Discussion of the Related Art

In recent years telecommunication systems have expanded from traditional POTS communications to include high-speed data communications as well. As is known, POTS communications includes not only the transmission of voice information, but also PSTN (public switched telephone network) modem information, control signals, and other information that is transmitted in the POTS bandwidth, which extends from approximately 300 hertz to approximately 3.4 kilohertz.

New, high-speed data communications provided over digital subscriber lines (DSL), such as Asymmetric Digital Subscriber Line (ADSL), Rate Adaptive Digital Subscriber Line (RADSL), High-Speed Digital Subscriber Line (HDSL), etc. (more broadly denoted as xDSL) provide for high speed data transmissions, as is commonly used in communicating over the Internet. As is known, the bandwidth for xDSL transmissions is generally defined by a lower cutoff frequency of approximately 30 kilohertz, and a higher cutoff frequency which varies depending upon the particular technology. Since the POTS and xDSL signals are defined by isolated frequency bands, both signals may be transmitted over the same two-wire loop.

Indeed, twisted pair public telephone lines are increasingly being used to carry relatively high-speed signals instead of, or in addition to, telephone signals. Examples of such signals are ADSL (asymmetric digital subscriber line), HDSL (High Density Subscriber Line, T1(1.544 Mb/s), and ISDN signals. There is a growing demand for increasing use of telephone lines for high speed remote access to computer networks, and there have been various proposals to address this demand, including using voice over data systems to communicate signals via telephone lines at frequencies above the voice-band. The provision in the public telephone network of varied services using such diverse communications systems imposes a requirement that different and similar systems not interfere with one another.

In the telecommunication art, the term "crosstalk" refers to interference that enters a message channel from one or more other channels through a path coupling the message channel with the interfering channels. Crosstalk can create annoyance in a voice system or errors in a data system. Crosstalk's impact depends upon such factors as the listeners hearing acuity, the extraneous noise, the frequency response characteristic of the coupling path, and the level of the disturbing signal.

There are generally two types of crosstalk mechanisms that are characterized, one being NEXT (near-end crosstalk) and the other being FEXT (far-end crosstalk). NEXT results from a disturbing source connected at one end of the wire pair causing interference in the message channel at the same end as the disturbing source. FEXT is that portion of the disturbing signal propagated to far end of the message channel, that is, the end opposite to the end to which the disturbing source is connected.

Allocations of wire pairs within telephone cables in accordance with service requests have typically resulted in a random distribution of pair utilization with few precise records of actual configurations. In addition, due to the nature of pair twisting in cables, and where cable branching and splicing occurs, a wire pair can be in close proximity to different other pairs over different parts of its length. At a telephone CO (central office), pairs in close proximity may be carrying diverse types of service using various modulation schemes, with considerable differences in signal levels (and receiver sensitivities) especially for pairs of considerably different lengths.

Statistical data has been developed that can be used to estimate crosstalk between services using different pairs of multi-pair telephone cables, for example in terms of BER (bit error rate) based on power spectral density (PSD, for example measured in milliwatts per Hertz expressed in decibels, or dBm/Hz) overlap between the services. However, this statistical data is of limited use in practice in the provision of a new service using equipment connected to a specific wire pair, in view of factors such as those discussed above.

A common feature of the above-mentioned transmission systems is that twisted-pair phone lines are used as at least a part of the transmission medium that connects a central office (e.g., telephone company) to users (e.g., residence or business). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is generally known as crosstalk interference, which includes NEXT interference and FEXT interference. As the frequency of transmission increases, the crosstalk interference becomes substantial. As a result, the data signals being transmitted over the twisted-pair phone lines at high speeds can be significantly degraded by the crosstalk interference caused by other twisted-pair phone lines in the binder. The problem worsens as the speed of the data transmission increases or as the loop length increases.

As is known, NEXT interference may result from several sources. One such source may be referred to upstream "leak" levels into a DSL downstream service at the customer premise (CP) side. As is also known, there are generally two techniques or approaches to reduce NEXT upstream leak: blind and supervised. Blind source separation is the separation of a composite signal into its constituent component signals, without a priori knowledge of those signals. A growing number of researchers have published articles discussing techniques that perform blind source separation (BSS). For example, "Equivariant Adaptive Source Separation", JF CARDOSO & B. LAHELD IEEE Trans. on Signal Proc., VOL. 44, No. 12, December 1996, and "Adaptive Blind Source Separation for virtually any Probability Density Function", V. ZARZOSO, A. NANDI. IEEE Trans. on Signal processing, Vol. 48, No. 2 Feb. 2000, discuss blind source separation. Both of these articles are hereby incorporated by reference in their entireties. These techniques find use in various applications, including crosstalk removal in multichannel communications, multipath channel identification, and equalization. Many of the BSS techniques require (or assume) a statistical independence between the component signals to accurately separate the signals. Additional theoretical progress in signal modeling has generated new techniques that address the problem of identifying statistically independent signals, which is a recognized problem that lies at the heart of source separation.

In contrast, "supervised" techniques rely on other information sources, collected from physical sensors. For example, "Multichannel Signal Processing for Data Communications in the Presence of Crosstalk", IEEE trans. on Communications, VOL. 38, No. 4, April 1990, and "Frequency selective NEXT Cancellation", J. CIOFFI, ICASSP 2000, VOL. 5, pp. 2841–2844, discuss supervised techniques. Both of these articles are hereby incorporated by reference in their entireties.

Accordingly, there is a need to provide an improved system and method for canceling crosstalk interference.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method and apparatus for reducing crosstalk in a telecommunication system. Broadly, the present invention utilizes a circuit that obtains a common mode signal from a differential signal of a local loop, to obtain additional information that can be used to better approximate the transmitted signal (by approximating and canceling crosstalk or otherwise). In contrast to some known prior art systems, the system and method of the present invention has no knowledge, nor does it make any assumptions, about the crosstalk or signals from disturber lines.

In accordance with one embodiment of the invention, a modem is provided having improved crosstalk cancellation circuitry for canceling crosstalk received on a local loop (or otherwise estimating the remotely transmitted signal) carrying modem communications. The modem includes a first input for receiving a signal carried on the loop and a second input for receiving a signal obtained from the common mode of the local loop. The modem further includes processing circuitry configured to either reduce crosstalk present in the signal carried on the local loop, or to otherwise closely approximate the remotely transmitted signal. The modem accomplishes this through computations based upon a first signal carried obtained from the local loop and a second signal obtained from the common mode of the local loop. Using these signals allows the processing circuitry of the modem to obtain more accurate results. In this regard, mathematical equations or expressions may be generated that model the received signal in terms of the remotely transmitted signal, the impulse of the local loop, the signal on one or more disturber lines, the impulse response of the crosstalk coupling, white noise, etc. The modem learning phase may be utilized to compute some of these terms, using blind, semi-blind, or supervised techniques. The use of a signal obtained from the common mode can provide an additional equation, which can be used and processed to provide more accurate computation results. Ultimately, this provides better crosstalk cancellation or otherwise better approximation of the remotely transmitted signal.

In accordance with another embodiment of the present invention, a method for reducing crosstalk on the local loop is also provided. The method obtains a first signal from the local loop and obtains a second signal from the common mode. Then, the method uses the first and second signals to compute a measure of crosstalk present on the local loop, and subtracts the measure of crosstalk from the first signal.

In an alternative embodiment, a similar method is provided. However, instead of computing a measure of crosstalk and subtracting the measure from the first signal (i.e., the received signal), the alternative embodiment approximates the transmitted signal. One way this approximation may be carried out is to utilize a covariance matrix (see Equation 28 below) and statistical probabilities to estimate or approximate the transmitted signal.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

As will be appreciated by persons skilled in the art, the concepts and teachings of the present invention may be applied to many types of telecommunication systems. However, the preferred embodiment and environment of the present invention applies to digital subscriber line (DSL) systems. As is known, the length of the local loop is a significant and limiting factor for DSL systems. Providing an improved system and method for reducing crosstalk can operate to extend the length or reach of the local loop in a DSL system. Although persons skilled in the art will understand the components and operation of a DSL system, reference is briefly made to FIG. 1, which summarizes the basic DSL environment.

In this regard, and as is known, the POTS frequency band generally extends from approximately DC to approximately 3.4 kilohertz. The DSL frequency band generally extends from approximately 30 kilohertz up to an upper boundary, which varies depending upon the particular digital subscriber line technology utilized. A separation or guard band provides some margin of signal separation, and thus noise and cross-talk immunity between signal transmissions between the POTS and DSL frequency bands.

Figure 1:
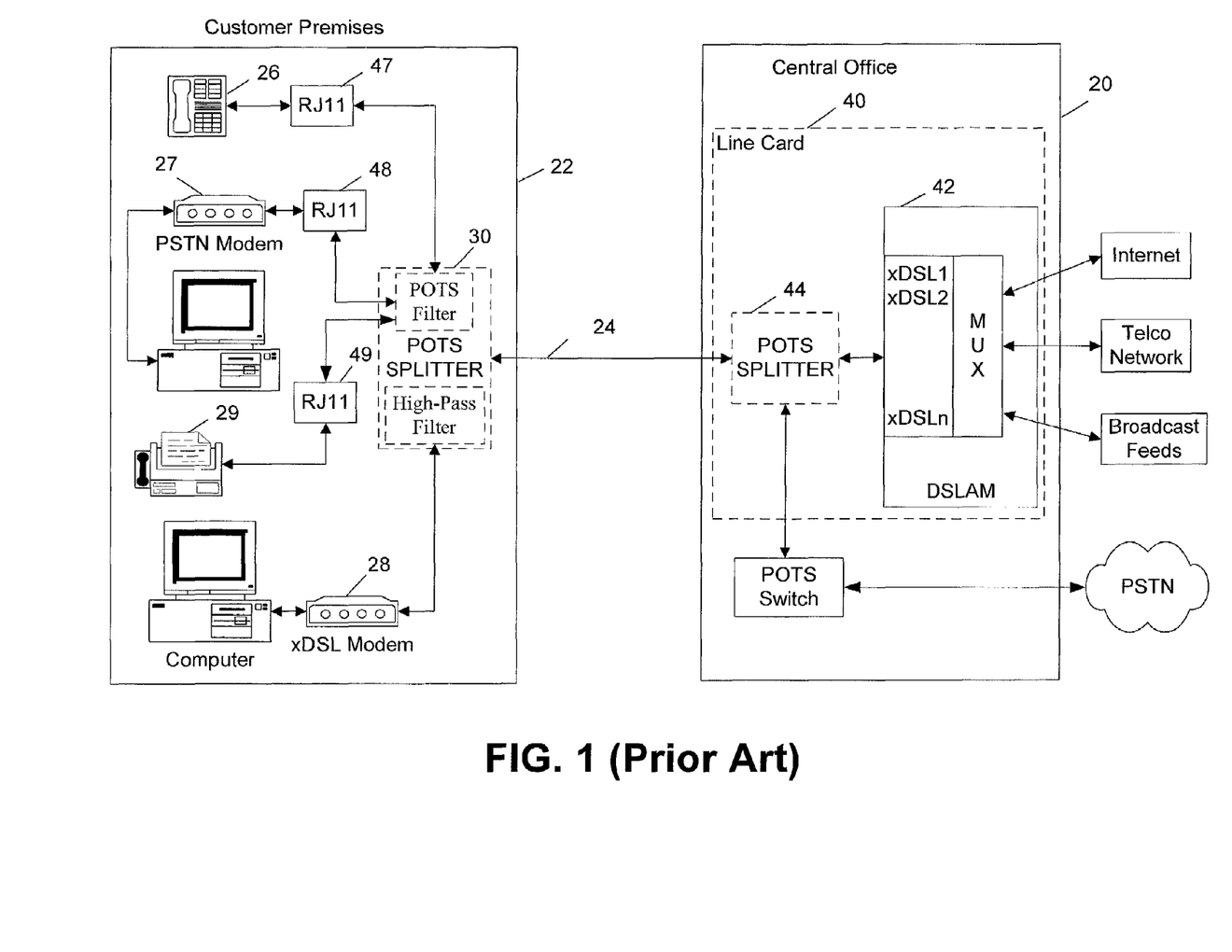
FIG. 1 is a diagram illustrating a basic DSL environment, including a customer premises and central office as is known in the prior art.

Referring now to FIG. 1, a prior art communication system is shown. Specifically, FIG. 1 illustrates communication between a central office 20 and a customer premises 22 by way of local loop 24. At the central office 20, additional circuitry is provided. Generally, a line card 40 (denoted by dashed lines) containing line interface circuitry is provided for electrical connection to the local loop 24. One or more xDSL modems, including both receiver and transmitter circuitry, are embodied in a DSL access multiplexer (DSLAM), denoted by block 42. This circuitry is directly connected for communications across the local loop 24. The remaining POTS circuitry may be separated, or buffered, from the local loop 24 by a POTS filter contained within a POTS splitter 30. As is also known, the POTS splitters 30 and 44 may or may not be required, depending upon the transmission protocol. For example, G.Lite and ADSL.Lite do not require POTS splitters and filters. For this reason, these components have been illustrated in dashed line.

While the customer premises 22 may be a single dwelling residence, a small business, or other entity, it is generally characterized as having POTS equipment, such as a telephone 26, facsimile machine 29, PSTN modem 27, etc. The customer premise 22 may also include an xDSL communication device, such as an xDSL modem 28. When an xDSL service is provided, a POTS splitter 30 may be interposed between the POTS equipment (e.g, 26, 27, 29) and the local loop 24. As is known, the POTS splitter 30 includes a low-pass filter having a cut-off frequency of approximately 4 to 10 kilohertz, in order to filter high frequency transmissions from the xDSL communication device 28 and protect the POTS equipment.

As illustrated, and as is known, in a typical customer premises, a plurality of RJ11 jacks 47, 48, and 49 are provided throughout the customer premises. These are typically interconnected, and originate from the point of entry into the customer premises. In the illustration of FIG. 1, each may originate from a POTS filter (within POTS splitter 30), which may be provided at the point of entry. Any POTS communication device may be directly plugged into any of these predisposed jacks 47, 48, and 49.

DSL communications typically use two pieces of equipment, one on the customer end, and one at the Internet Service Provider, telephone company or other provider of DSL services. At the customer's location there is a DSL transceiver (sometimes referred to as a DSL modem and other times referred to as an ATU-R), which may also provide other services. The DSL service provider has a DSLAM 42 to receive customer connections.

The DSL modem 28 is the point where data from the user's computer or network is connected to the DSL line (i.e., the local loop 24). The transceiver 28 can connect to a customer's equipment in several ways, though most residential installation uses USB or 10-baseT Ethernet connections. While most of the DSL transceivers sold by ISPs and telephone companies are simple transceivers, the devices used by businesses may combine network routers, network switches or other networking equipment in the same platform.

The DSLAM 42 at the access provider is the equipment that really allows DSL to happen. A DSLAM 42 takes connections from many customers and aggregates them onto a single, high-capacity connection to the Internet. DSLAMs are generally flexible and able to support multiple types of DSL in a single central office and different varieties of protocol and modulation—e.g., both CAP (Carrierless Amplitude Phase) and DMT (Discrete Multi-Tone), for example—in the same type of DSL. In addition, the DSLAM 42 may provide additional functions including routing or dynamic IP (Internet Protocol) address assignment for the customers.

The DSLAM 42 provides one of the main differences between user service through DSL and through cable modems. Because cable modem users generally share a network loop that runs through a neighborhood, additional users mean lowered performance in many instances. DSL provides a dedicated connection from each user back to the DSLAM 42, meaning that users won't see a performance decrease as new users are added—until the total number of users begin to saturate the single, high-speed connection to the Internet. At that point, an upgrade by the service provider can provide additional performance for all the users connected to the DSLAM 42.

Figure 2A:
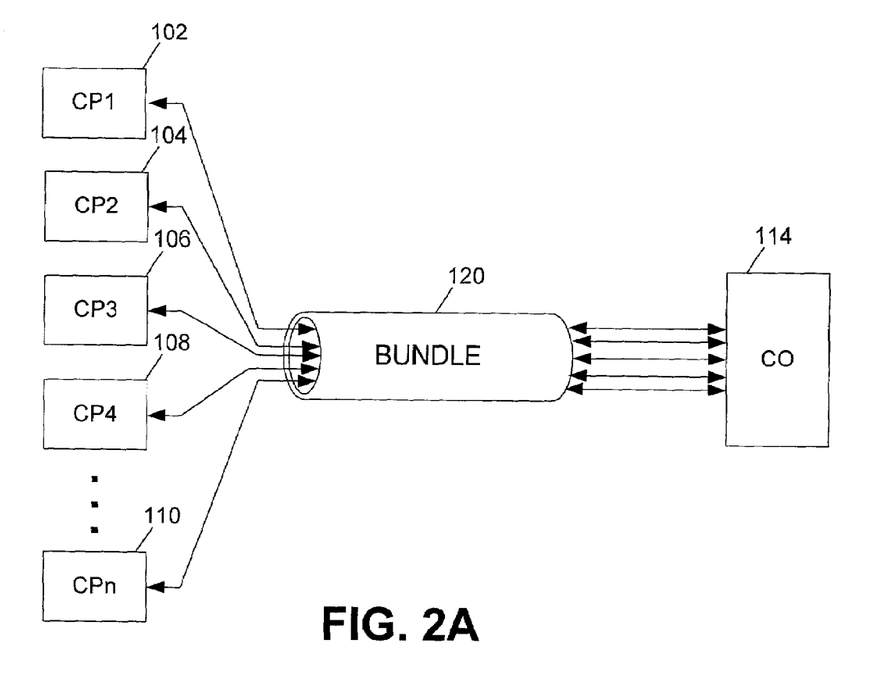
FIGS. 2A and 2B illustrate the manner in which multiple local loops are bundled, which may result in cross-coupling and crosstalk.
Figure 2B:
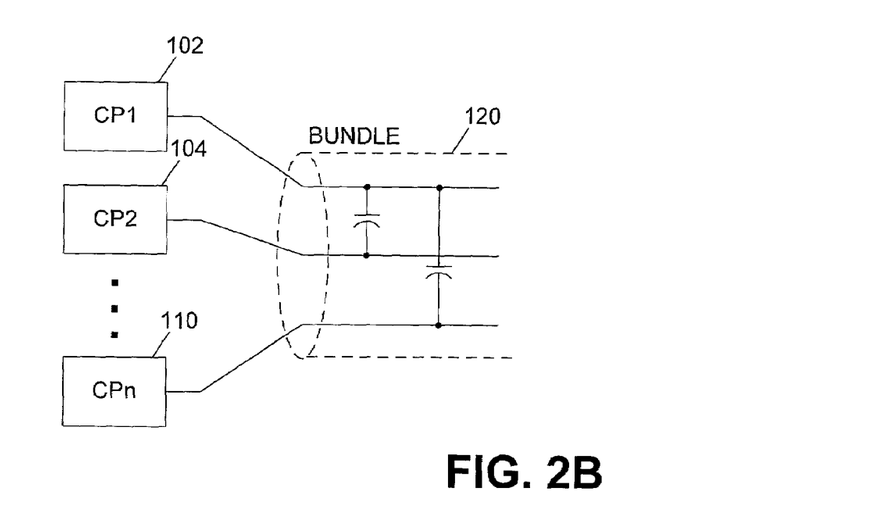

As shown in FIG. 2A, multiple loops from various customer premises 102, 104, 106, 108, 10, are typically grouped in a common bundle 120 (sometimes called a binder), through which they are routed to a central office 114. As shown in FIG. 2B, the various lines are capacitively-coupled, due to their close proximity within the bundle 120. This coupling permits crosstalk. As is known, crosstalk is a limiting factor in the wideband DSL standards that are currently evolving. Due to the capacitive coupling between adjacent wires in a bundle, data transmissions on one line 130 may interfere with data transmissions on another line.

Figure 3A:
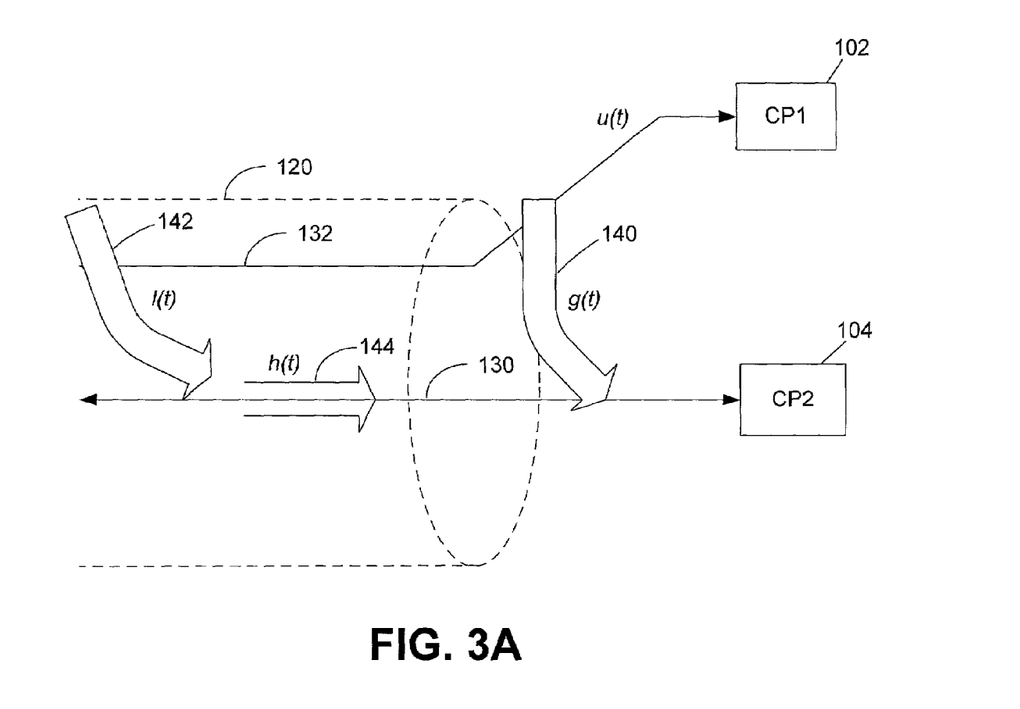
FIGS. 3A and 3B are diagrams illustrating various sources of crosstalk and NEXT disturbance in a bundled line.
Figure 3B:
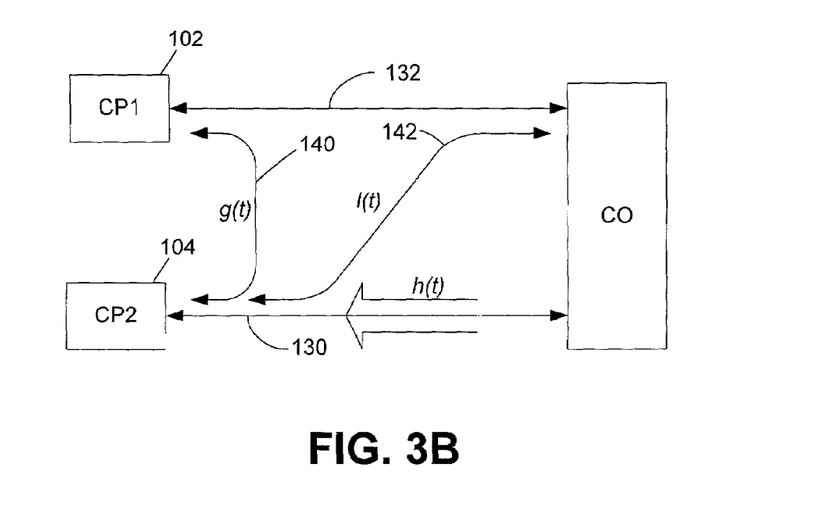

Reference is now made to FIGS. 3A and 3B, which more particularly illustrate the various sources of crosstalk in a telecommunications system. For example, FIG. 3A illustrates only two of the lines 130 and 132, which may be present within a bundle 120. As previously mentioned, the crosstalk noise may be separated into two identifiable components, NEXT and FEXT. Assume that a DSL modem at CP1 102 as a disturber source that interfers or injects crosstalk onto the loop for CP2 104. The NEXT component 140 of this crosstalk is represented by the symbol g(t) (the impulse response of the NEXT cross-coupling between the disturber line and the disturbed line). Likewise, the FEXT component 142 is represented by the symbol l(t) (the impulse response of the FEXT cross-coupling between the disturber line and the disturbed line). In addition, the loop itself may be characterized by an impulse response, represented by the symbol h. As is further known, the NEXT component is typically a much more significant crosstalk component (especially for long loops), since the NEXT disturber source is typically much closer to the disturbed receiver.

Crosstalk noise may be reduced by subtracting the induced crosstalk. Since it is impossible to determine an exact quantization of crosstalk that is induced, an estimation or approximation of the crosstalk may be subtracted from the signal at a disturbed receiver. Statistical properties of the crosstalk might be also used to increase the accuracy of a straight main signal estimation. As will be appreciated, better noise immunity is obtained, as crosstalk is more accurately measured or estimated. Consequently, the reach of the local loop may be extended for DSL communications.

Ignoring FEXT, a signal received at a receiver may be expressed as:

$$r[n]=(h \otimes e)[n]+(g \otimes u)[n]+w[n],\qquad\text{Equation 1}$$

where, r denotes the received signal, h denotes the impulse response of the loop, e denotes the transmitted signal that is desired to be recovered, g(t) denotes a impulse response of the cross-coupling component between the disturber line and the disturbed line, u[n] denotes the signal on the disturber line, w[n] denotes white noise, n represents discrete time samples, and the $\otimes$ symbol represents a convolution operation.

Figure 4:
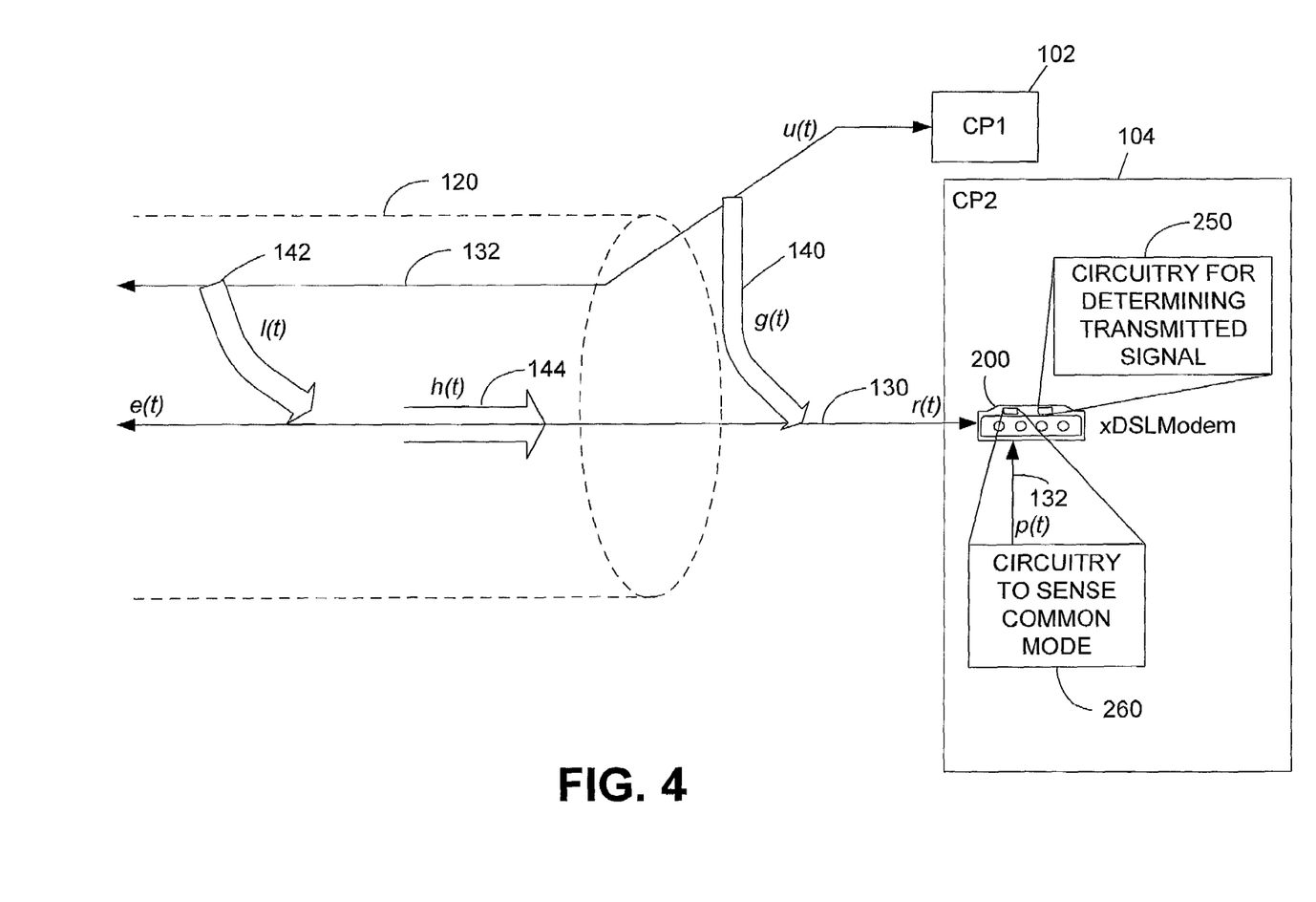
FIG. 4 is a diagram similar to FIG. 3A, but illustrating the use of a common mode signal in accordance with the invention.

Reference is now made to FIG. 4 which is a diagram similar to the diagram of FIG. 3A, but illustrating one embodiment of a system constructed in accordance with the invention. In this regard, the present invention is directed to a system and method for canceling crosstalk (or otherwise reducing the effects of crosstalk) on a local loop 130, which carries a first signal r(t). A fundamental feature of the present invention is the utilization of a common mode signal, obtained from the local loop, to generate a second signal p(t). Both of these signals (r(t) and p(t)) are utilized to create multiple independent equations that can be solved to either directly approximate the remotely transmitted signal e(t), or to approximate a measure of crosstalk on the local loop, and from the measure of crosstalk approximate the transmitted signal e(t).

As summarized above, two modes have access to the victim modem 200. One is the classical differential mode that brings the DSL service and the other one is the common mode. It is assumed that both modes experience NEXT due to at least one disturbance source. For the moment, we consider only one disturber u(t) (the extension to two or more disturbers is straightforward). NEXT into the common mode is due to the coupling between the disturber pair (differential pair) and the common mode. NEXT into the victim modem 200 is due to the coupling between the disturber line 132 and the mode supporting DSL service, i.e. the differential mode. The DSL downstream signal e(t) experiences propagation along the loop. The same DSL downstream signal is coupled into the common mode. The victim modem 200 receives two signals r(t) and p(t) (or r[n] and p[n], after sampling), respectively on the differential and on the common modes. These signals share filtered versions of the DSL downstream signal e[n] and the disturber signal u[n].

The present invention uses both signals r[n] and p[n] to develop an accurate estimate of the downstream DSL signal, ẽ[n].

In FIG. 3A, a cross-coupling components g(t) (for NEXT) and l(t) (for FEXT) were discussed. Similar cross-coupling components are present in the system of FIG. 4. If f, g, h, and l designate impulse responses of propagation and coupling effects as illustrated in FIG. 4. If we neglect the FEXT from 132 into 130, both received signals take the following form:

$$p[n]=(f^*u)[n]+(l^*e)[n]+w[n]\qquad\text{Equation 2}$$

where k[n] is the coupling between the emitted differential mode of 130 into the received common mode of 130. Indeed, (k*e)[n] represents the leak of the emitted signal into the common mode.

$$r[n]=(h^*e)[n]+(g^*u)[n]+v[n]\qquad\text{Equation 3}$$

w[n] and v[n] are two independent processes. w[n] is as usually assumed (into the differential mode) a white gaussian noise. The signal w[n] exhibits a white noise component η[n] plus RFI perturbations rf[n] due to the "antenna" behavior of the common mode:

$$w[n]=\eta[n]+rf[n]\qquad\text{Equation 4}$$

Consistent with the scope and spirit of the present invention, there are a variety of approaches to "solving" the equations presented above. One way would be to compute a measure of the crosstalk present in the received signal r(t), and then subtract that measure from the received signal to approximate the transmitted signal e(t). Another approach would be to use a covariance matrix and statistical probabilities to directly approximate the remotely transmitted signal e(t). In these approaches, the modem learning phase may be utilized to obtain certain information about the variables of Equations 2 and 3. Also, blind, semi-blind, and/or supervised techniques may also be utilized. Such techniques are known and therefore need not be described herein.

The problem is based on Equations 2 and 3 that may be rewritten in the time domain as a noisy convolutive mixing of 2 independent sources:

$$\begin{pmatrix} r \\ p \end{pmatrix}[n] = \begin{pmatrix} h & g \\ k & f \end{pmatrix} * \begin{pmatrix} e \\ u \end{pmatrix}[n] + \begin{pmatrix} v \\ w \end{pmatrix}[n] \qquad \text{Equation 5}$$

In the frequency domain, for bin q and symbol t, we have a linear mixing problem:

$$\begin{pmatrix} R \\ P \end{pmatrix}[q,t] = \begin{pmatrix} H & G \\ K & F \end{pmatrix}[q]\begin{pmatrix} E \\ U \end{pmatrix}[q,t] + \begin{pmatrix} V \\ W \end{pmatrix}[q,t] \qquad \text{Equation 6}$$

In order to reduce the contribution of the RFI into w[n] (see Equation 3), a pre-processing of the common mode p[n] is required, such as a linear filtering, notch filtering of the RFI and (or) matched filter to the spectral density. We call p'[n] the preprocessed common mode:

$$p'[n]=\aleph(p[n])\qquad\text{Equation 7}$$

Then we have, still in the frequency domain:

$$\begin{pmatrix} R \\ P' \end{pmatrix}[q,t] = \begin{pmatrix} H & G \\ K' & F' \end{pmatrix}[q]\begin{pmatrix} E \\ U \end{pmatrix}[q,t] + \begin{pmatrix} V \\ W' \end{pmatrix}[q,t] \qquad \text{Equation 8}$$

Any semi-blind method based on 2 sensors may be applied either in the time domain or in the frequency domain.

In keeping with the description of FIG. 4, in a system constructed in accordance with the invention, a site (typically a customer premises) receives a local loop 130. From the local loop, two signals r(t) and p(t) are obtained. The first signal is the signal r(t) directly received by a DSL modem 200. As is known, this is a differential signal. As is also known, this loop 130 may also carry a POTs signal, since POTS signals and DSL signal are carried in separate frequency bands.

The second signal is the common mode signal. This signal is obtained circuitry 260, which will be described in more detail in connection with FIG. 9. Significantly, this circuitry obtains the common mode signal, without deteriorating or otherwise affecting the first signal. As will be discussed in more detail below, the DSL modem 200 includes circuitry 250 for processing the received and common mode signals r(t) and p(t) to determine the transmitted signal e(t).

Figure 5:
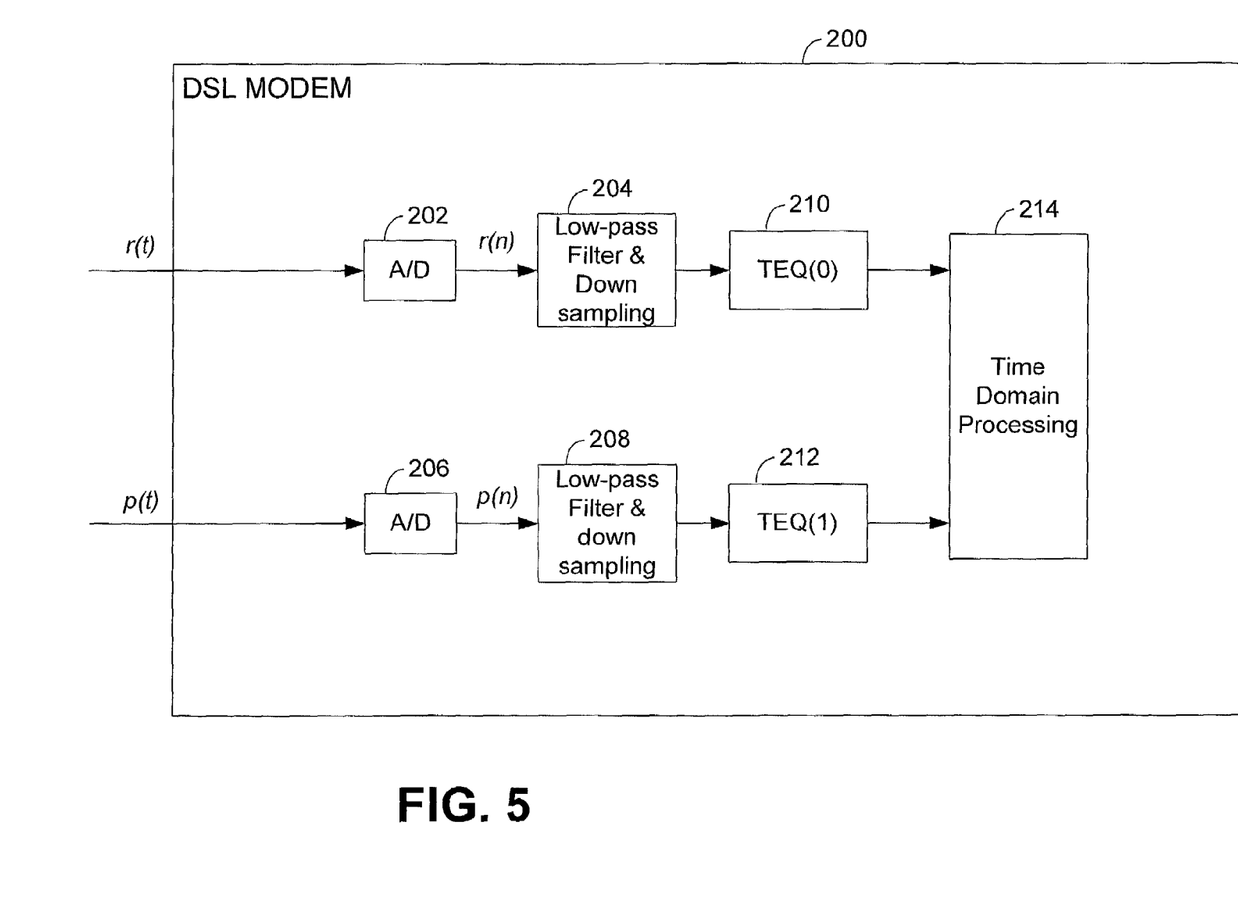
FIG. 5 is a block diagram illustrating certain components in the receiver portion of a DSL modem constructed in accordance with one embodiment of the invention.

Reference is made to FIG. 5, which is a diagram illustrating certain components of a modem receiver 200, which may be used to implement the crosstalk cancellation of the present invention, in the time domain. Of course, the modem 200 will include many other components, which need not be illustrated herein, as they will be understood by persons skilled in the art. Instead, FIG. 5 illustrates those components, which most impact the implementation of the present invention. In a first data stream, a received signal (r(t)) is sampled and converted by analog to digital (A/D) converter 202 into a sampled signal (r(n)). The signal output from the A/D 202 is then passed through a low-pass filter 204, which prevents aliasing.

In a second data stream, a second signal (p(t)) is sampled and converted by A/D converter 206 into a sampled signal (p(n)). The signal output from the A/D 206 is then passed through a low-pass filter 208, which prevents aliasing of the second signal. Each data stream is then processed separately by time-domain equalizers 210 and 212. Thereafter, the respective data streams are processed in the time domain processing circuitry 214. This circuitry performs the mathematical processing, including the convolution and deconvolution operations, for solving the equations of Equations 2 and 3, to determine the crosstalk components and/or the original transmitted signals. As described herein, the "solutions" to these equations may involve computing a measure of the crosstalk on the first local loop 130, and subtracting this component from the received signal r(t), in order to compute (or closely approximate) the remotely transmitted signal e(t). Alternatively, the solution to these equations may be to use a covariance matrix and statistical probabilities to directly estimate the transmitted signal e(t) (i.e., without first computing and subtracting a measure of crosstalk).

Figure 6:
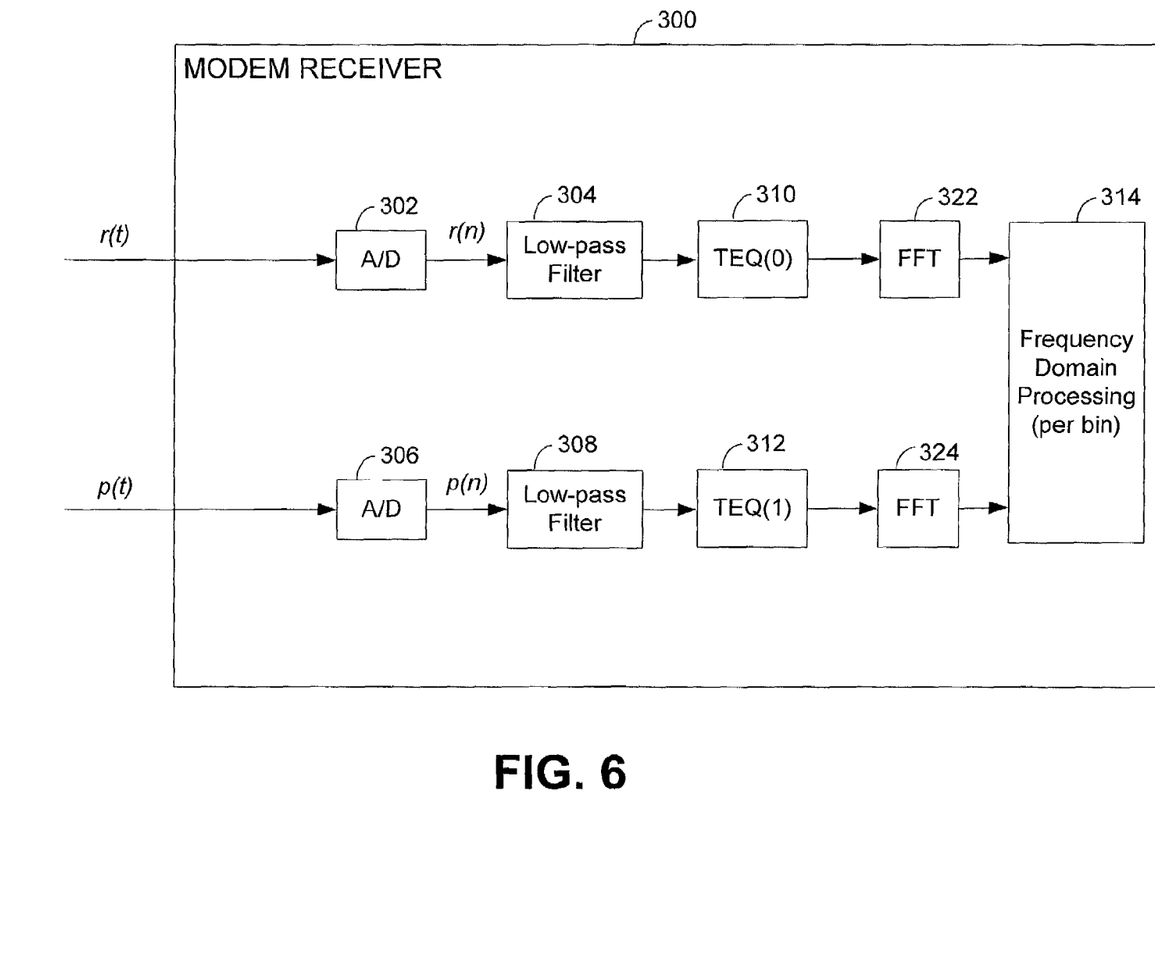
FIG. 6 is a block diagram illustrating certain components in the receiver portion of a DSL modem constructed in accordance with another embodiment of the invention.

Reference is made to FIG. 6, which a diagram similar to FIG. 5, but illustrates certain components of a receiver 300, which may be used to implement the crosstalk cancellation of the present invention in the frequency domain. In short the A/Ds 302 and 306, the filters 304 and 308, and the time domain equalizers 310 and 312 function in the same fashion as described in connection with FIG. 5. The output of the time domain equalizers (TEQs) 310 and 312, however, are directed to FFTs 322 and 324, respectively, which compute the FFTs of the TEQ outputs. There are many well-known techniques and algorithms for computing the FFT of a digital data stream, so these details need not be described herein. Significantly, the FFTs 322 and 324 convert the time-domain data streams into the frequency domain data stream. These data streams may then be processed by the frequency domain processing circuit 314. As is known, the mathematical intensity of solving the equations of Equations 2 and 3 may be simplified by processing in the frequency domain, as time domain convolution operations become frequency domain multiplication operations instead. Again, the performance of the mathematical operations is within the level of one possessing ordinary skill in the art, so it need not be described herein.

It should be appreciated that the functional blocks of the diagrams illustrated in FIGS. 5 and 6 may be implemented in hardware, software, or a combination of the two, including micro-coded hardware (e.g. assembly-language or other programmed hardware, firmware etc.).

Figure 7:
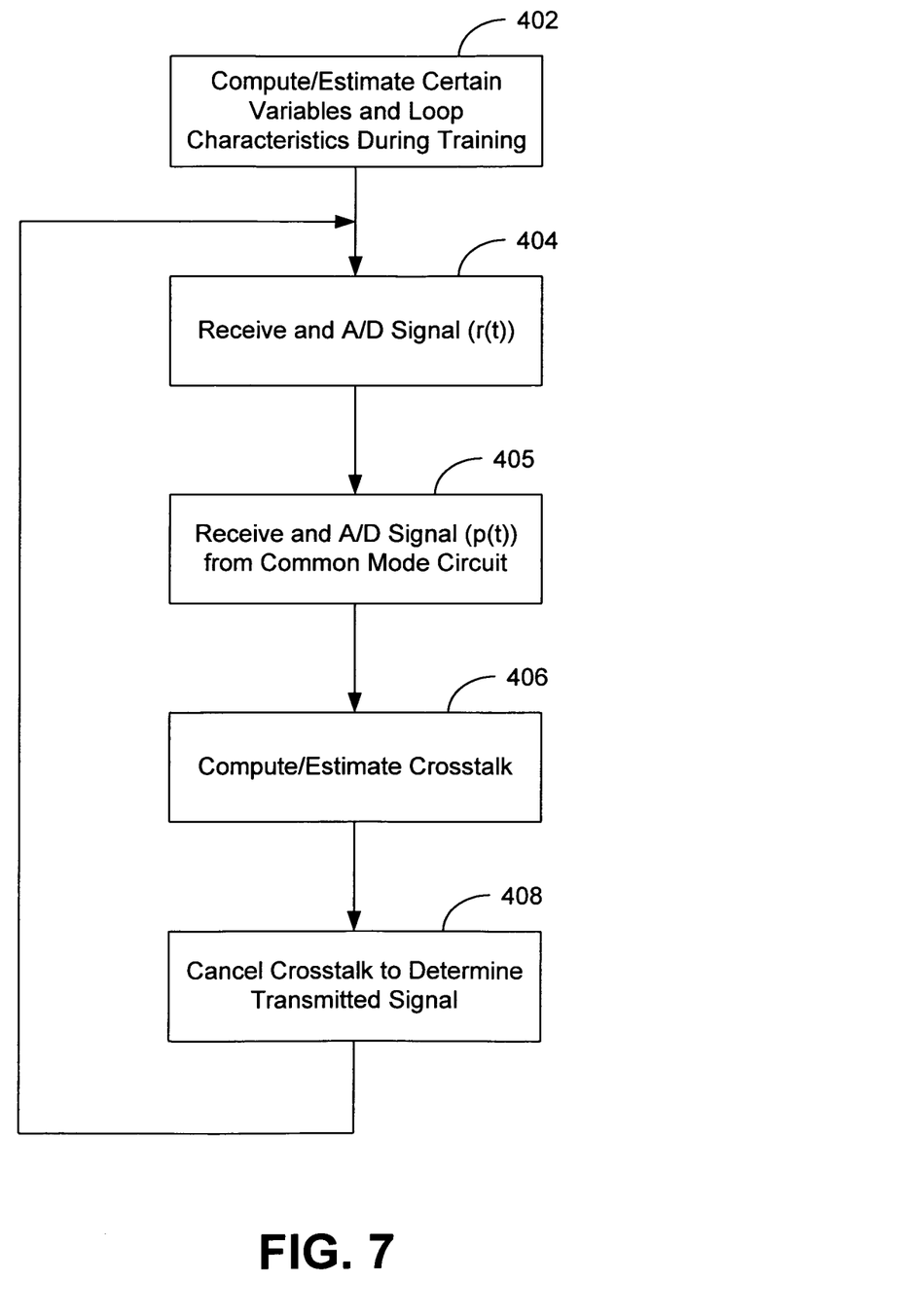
FIG. 7 is a flowchart illustrating the top level operation of one embodiment of the invention.

In view of the foregoing discussion, it will be appreciated that one aspect of the present invention embodies a novel method for reducing crosstalk in a telecommunication system. Reference is now made to FIG. 7, which is a flowchart that illustrates the principal steps of this method. Specifically, during a training or learning phase of a modem, certain variables and/or loop characteristics (e.g., loop impulse response) are computed and/or estimated (step 402). These computed/estimated values are later used during modem operation. During this later modem operation, a first signal r(t) is received on a local loop (step 404). At the same time, a second signal p(t) is obtained from the common mode (step 405). Generating/obtaining the second signal p(t) in this way provides a measure of redundancy, which is used to establish multiple, independent equations in the form of Equations 2 and 3 above, which can be solved to compute (or closely estimate) the crosstalk (step 406). After the crosstalk is computed, is may be subtracted from the received signal to obtain the transmitted signal (step 408).

Figure 8:
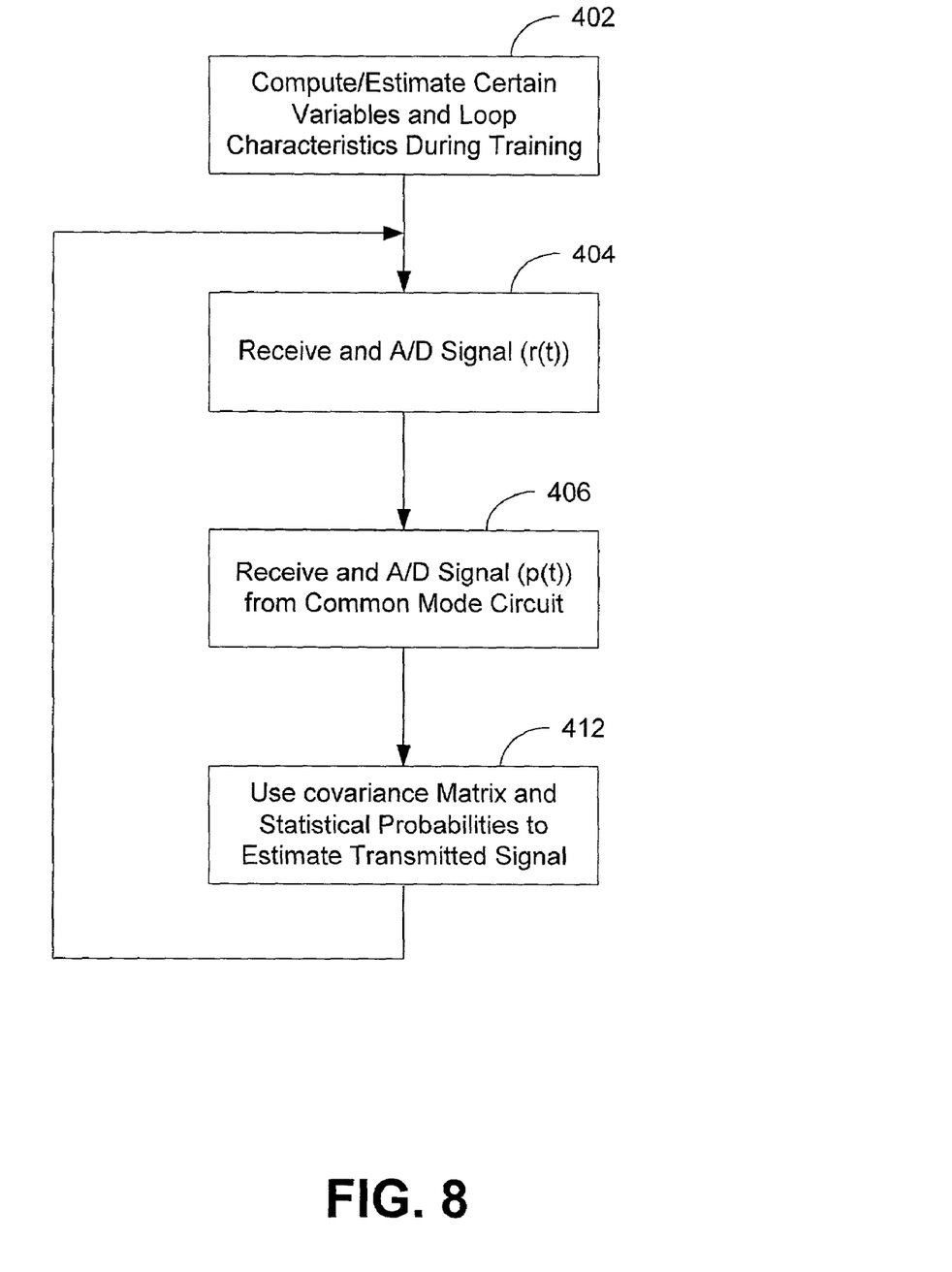
FIG. 8 is a flowchart illustrating the top level operation of an alternative embodiment of the invention.

Reference is made briefly to FIG. 8, which illustrates an alternative embodiment of the invention. As shown, the method illustrated in FIG. 8 is similar to the method of FIG. 7, except that the measure of crosstalk itself is not computed. Nor is a measure of crosstalk subtracted from the received signal to approximate the transmitted signal. Instead, statistical probabilities may be used to estimate the crosstalk covariance matrix, which may be used to estimate the transmitted signal (step 412).

Figure 9:
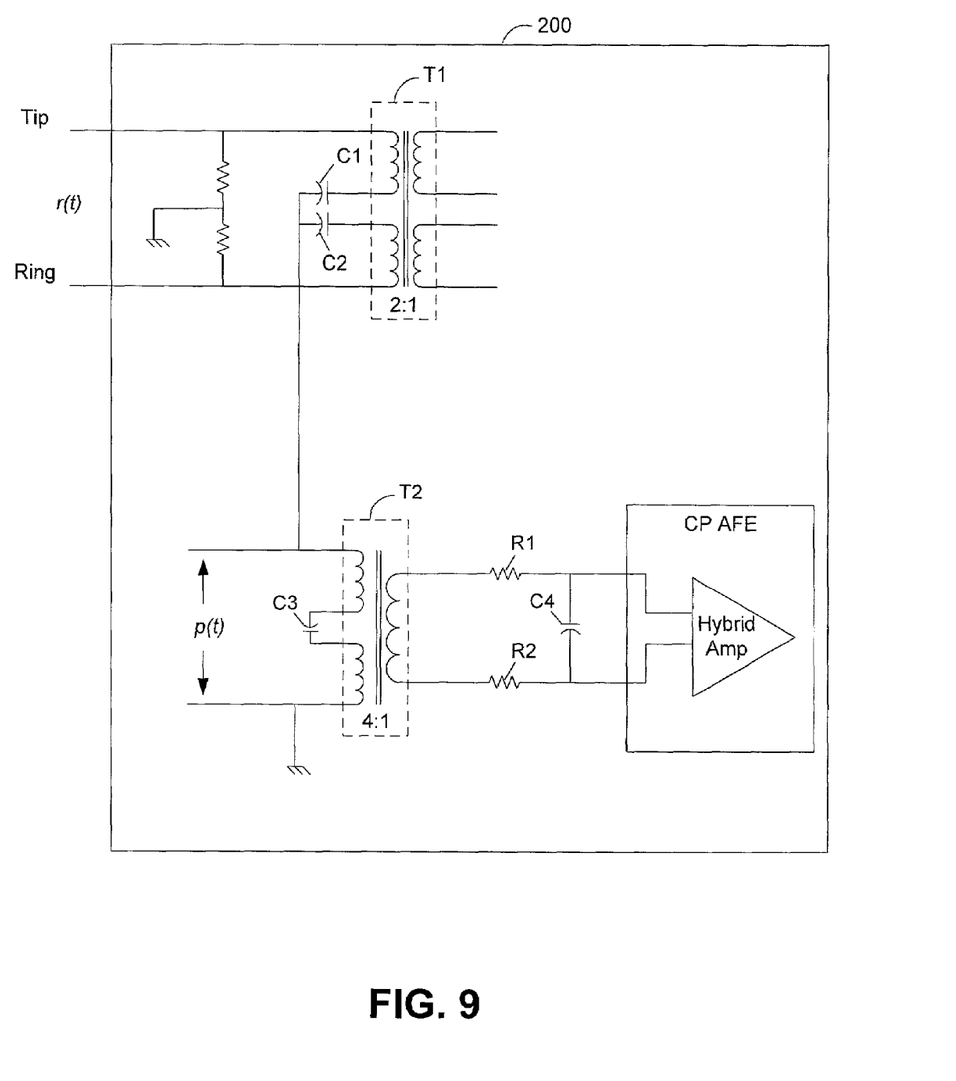
FIG. 9 is a circuit diagram illustrating one circuit configuration that may be used to obtain a common mode signal.

Reference is now made briefly to FIG. 9, which is a circuit diagram of a portion of the DSL modem 200 that contains a circuit that may be utilized to obtain the common mode signal. It should be appreciated that numerous circuits may be employed consistent with the scope and spirit of the present invention. The circuit of FIG. 9, however, is provided herein purely for purposes of illustrating one embodiment. Since the details of the circuit of FIG. 9 are not deemed to be limiting upon the present invention, its structure and operation will not be described in detail herein. In the embodiment illustrated, the values of the various components are preferred to be as follows: T1 is a C1905 with a 474 $\mu$ Henry winding. T2 is a C2208 with a 2 mHenry winding. C1 and C2 are both 68 nanoFarad capacitors. C3 is a 680 pico Farad, 250 volt capacitor. C4 is a 1.5 nanoFarad. Finally, R1 and R2 are both 49.9 ohm resistors.

In the configuration of FIG. 9, the circuit obtains the common mode signal p(t) as shown. In addition, the circuit configuration performs a band pass filtering operation, having a pass band extending from 138 kHertz to 1.1 Mhertz. This band pass filter contains a second order high-pass filter with a corner frequency at 138 kHertz and a first order low-pass filter with a corner frequency at 1.1 MHertz. Advantageously, the band pass filter prevents out of band signals from saturating the analog front end (AFE).

As previously mentioned, one approach to "solving" Equations 2 and 3 is to make certain assumptions. For example, it may be assumed that the FEXT component is significantly smaller than the NEXT component. Making this assumption reduces Equation 3 to:

$$r[n] = (h \otimes e)[n] + (\xi \otimes p)[n] + \eta[n], \quad \text{Equation 9}$$

where $\xi[n]$ denotes an equivalent coupling and $\eta[n]$ denotes a white noise. In addition, by ignoring FEXT, we can make the assumption that p[n] is substantially uncorrelated with e[n]. During a silent phase (i.e., e[n]=0), $\xi[n]$ may be learned either in the time or frequency domain, using a minimum mean square deconvolution or adaptive filtering. Later, during data mode, the term $(\xi \otimes p)[n]$ may be subtracted from the received signal r[n] in a block or adaptive fashion, eventually including decision feedback. To improve the adaptation of $\xi$ and to reduce the interference from out of band signals, p[n] should be band pass or high pass filtered to the adaptive filter representing $\xi$.

The equations expressed above may be readily extended to account for a plurality of NEXT and FEXT sources. In the case of a plurality of NEXT sources indexed by j, $1 \leq j \leq N$, the received DSL differential mode signal r[n] and common mode signal p[n] take the following form:

$$r[n] = (h * e)[n] + \sum_{j=1}^{N} (g_j * u_j)[n] + v[n] \quad \text{Equation 10}$$

$$p[n] = \Sigma (f_j * u_j)[n] + (l * e)[n] + w[n] \quad \text{Equation 11}$$

Now the coupling impulse responses bear relevant subscripts, Equations 9 and 10. As a matter of fact based on spectral density and probability density equivalence, it is possible to rewrite the above equation, as if only one "global" NEXT source $\tilde{u}[n]$ was present:

$$r[n] = (h * e)[n] + (\tilde{g} * \tilde{u})[n] + v[n] \quad \text{Equation 12}$$

$$p[n] = (f_j * u_j)[n] + (l * e)[n] + w[n] \quad \text{Equation 13}$$

Now the problem consists in recovering e[n] based on the signals: {r[n], p[n]}, and constitutive Equations 9 and 10. Again, these equations may be solved using methods that are known or readily understood by persons skilled in the art. In this process, the modem learning phase may be used and/or certain approximations may be made. The following discussion explores some of the mathematical methods and techniques, which may be utilized in this process. The following is presented only for purposes of illustration, and it not considered to be necessary for, or limiting upon, the present invention.

We propose hereafter a model of several different Xtalks, which have an equivalent spectral density and probability density and, moreover is very simple. We use the following notations: $p_q[nT_0]$, $1 \leq q \leq Q$ designates Q crosstalks, which are by essence uncorrelated, zero mean, white and not necessarily Gaussian. Their spectral density and variances are respectively denoted by $\dot{\gamma}_q(v)$ and $$\sigma_q^2.$$

Finally $\dot{g}_q(v)$ represents both the spectral shaping and the coupling frequency transfer functions. Its inverse Fourier transform is written $g_q[nT_0]$. Let us consider now the global signal due to the contribution of all the Xtalks:

$$y[nT_0] = \sum_{q=1}^{Q} g_q[(n-s)T_0] p_q[sT_0] \quad \text{Equation 14}$$

Because of the limit central theorem, the global signal is Gaussian. Its spectral density is equal to:

$$\dot{\gamma}_y(v) = \sum_{q=1}^{Q} \sigma_q^2 |g_q(v)|^2 \quad \text{Equation 15}$$

Equation (14) may be rewritten in the following manner:

$$\dot{\gamma}_y(v) = \left( \sum_{q=1}^{Q} \sigma_q^2 \right) \sum_{q=1}^{Q} \alpha_q |g_q(v)|^2 \quad \text{Equation 16}$$

If we introduce filters of frequency gain $\dot{g}(v)$ (the solution is not unique) such that:

$$|\dot{g}(v)|^2 = \sum_{q=1}^{Q} \alpha_q |g_q(v)|^2 \quad \text{Equation 17}$$

and a global variance $$\sigma^2 = \sum_{q=1}^{Q} \sigma_q^2 \quad \text{Equation 18}$$

then the spectral density of the global signal is equal to:

$$\dot{\gamma}_y(v) = \sigma^2 |\dot{g}(v)|^2 \quad \text{Equation 19}$$

Therefore, to summarize the foregoing: a summation of white and uncorrelated crosstalks have the same spectral density of a unique white disturber p[n] with a coupling channel frequency transfer function $\dot{g}(v)$ satisfying (15) and with a variance equal to (17). A consequence of the above property is that it is not necessary to identify the various crosstalks (from various sources) one by one to reduce their global effect.

Blind methods may be used either to equalize or to estimate $g^{(i)}$. As is known, blind equalizers make use of linear prediction, CMA, MMA RCA algorithms. Blind identification will be based on subspace methods. With the blind equalizers, compensation of the crosstalks can be made. Based on the estimated channels, global deconvolution can be made.

As will be appreciated, a semi-blind method may also be employed to estimate certain variables. As is known, using a semi-blind estimation technique, certain information may be approximated or calculated during the learning phase of the modem. Since various methodologies are known for implementing semi-blind computations and estimations, they need not be described herein.

As discussed above, the computations carried out by the present invention may be performed in either the time domain or the frequency domain. Having discussed a time domain approach above, reference will now be made to a frequency domain approach.

The synthesis hereafter makes an explicit use of the bin rank q and the symbol time index t. All of these methods are based on the "double path" that stems from the oversampling by a factor of 2, of the received data. In the frequency domain after TEQ and FEQ (just before slicing), the model on which these methods rely is the following.

$$\begin{cases} X^{(0)}[q,t] = H^{(0)}[q]E[q,t] + V^{(0)}[q,t] \\ X^{(1)}[q,t] = H^{(1)}[q]E[q,t] + V^{(1)}[q,t] \end{cases},$$

q is the bin rank, and t is the time symbol index

Equation 20 where:

E[q, t] is the emitted complex constellation point for the bin q and the symbol t.

The superscript $^{(i)}$, $0 \leq i \leq 1$, refers to the path.

$V^{(i)}[q, t]$ stands for the whole perturbation of bin q of symbol t on path i, i.e. the Xtalk and the AWGN (Additive White Gaussian Noise).

$H^{(i)}[q]$ is a residual complex "main channel" gain per bin q, on path i.

Equation (19) may be written in a more compact form as:

$X[q,t]=H[q]E[q,t]+V[q,t]$, q is the bin rank and t is the symbol time index. Equation 21 where:

R[q] denotes the correlation matrix of V[q, t]:

$R[q]=E\{V[q,t]V^*[q,t]\}$ Equation 22

In what follows, we will refer to the global perturbation model.

In case of a single Xtalk, the above model reduces to:

$$\begin{cases} X^{(0)}[q,t] = H^{(0)}[q]E[q,t] + G^{(0)}[q]P[q,t] + W^{(0)}[q,t] \\ X^{(1)}[q,t] = H^{(1)}[q]E[q,t] + G^{(1)}[q]P[q,t] + W^{(1)}[q,t] \end{cases}$$

Equation 23 where:

$W^{(i)}[q,t]$ stands for the AWGN of bin q of symbol t on path i.

$G^{(i)}[q]$ is a residual complex "coupling channel" gain per bin q, on path i.

P[q, t] is the Fourier transform of the single Xtalk, per bin q, symbol t, on path i.

Equation (20) may take a more compact form:

$X[q,t]=A[q]S[q,t]+W[q,t]$, q is the bin rank and t is the symbol time index. Equation 24

In what follows, we will refer to Equation (23) as the single Xtalk model, and make the following observations.

D1. Through the symbols, and per bin q the Xtalk P[q,t] is white:

$E\{P[q,t]P^*[q,t-\tau]\}\alpha\delta[\tau]$ Equation 25

τ refers to the symbol time index, and not the sampling rate.

D2. Under stationarity assumption, and because of the Fourier transform properties, there is no correlation between two different bins of the Xtalk:

$E\{P[q,t]P^*[q',t]\}\alpha\delta[q-q']$ Equation 26

D3. For all the Xtalks that are finite alphabet in the time domain (HDSL, ISDN, T1), because of the limit central effect of the Fourier Transform, the Xtalk P[q,t] is gaussian, complex and circular.

D4. From one symbol to another one, Xtalk exhibits no correlation (model (1) & (2)):

$E\{V[q,t]V^*[q,t-\tau]\}R[q]\delta[\tau]$ Equation 27

D5. In the case of a single Xtalk and when there is no white noise, the matrix R[q] is singular. In practice however, there is always white noise, R[q] is thus considered as invertible.

Methods considered fall into 2 categories: methods based on the global perturbation model, and methods based on single perturbation model.

Methods Based on Global Perturbation Model

Soft Maximum Likelihood and Slicing: ML Estimation and Slicing MLES

The method 1) minimizes a weighted norm with respect to the symbol but without any constraint and 2) to slice the relevant result. We have in a compact form:

$$\hat{E}_{MLES}[q,t] = \left[ \frac{H^+[q]R^{-1}[q]X[q,t]}{H^+[q]R^{-1}[q]H[q]} \right]_{Shce}$$

Equation 28

This is also known as the covariance matrix. As will be appreciated, $H^+$ represents the transpose conjugate of H. As in the previous sections, the vector H[q] and the matrix R[q] may be estimated blindly, semi-blindly, or in a supervised mode. The blind step involves a decision directed algorithm.

Simplified Maximum Likelihood Estimation and Slicing SMLES

Three other methods (with lower complexity and lower performance) might be deduced from Equation (27):

SMLES1.

$$\hat{E}_{SMLES1}[q,t] = \left[ \frac{H^+[q]X[q,t]}{H^+[q]H[q]} \right]_{Shce}$$

Equation 29

SMLES2.

$$\hat{E}_{SMLES2}[q,t] = \left[ \frac{1^+X[q,t]}{2} \right]_{Shce}$$

Equation 30 where:

$1^+=[1\ 1]$

This means that the SMLES2 is nothing but an average of the "2 paths".

SMLES3 (Brute force method).

$\hat{E}_{SMLES3}[q,t]=[[10]X[q,t]]_{Slice}$ Equation 31

As in the previous sections, the vector H[q] may be estimated blindly, semi-blindly, or in a supervised mode. The blind step involves a decision directed algorithm.

Method Based on the Single Xtalk Model g, MINV (Matrix Inversion Method)

The method here consists in applying the invert of the matrix A[q] to X[q, t] and then, slicing the proper component:

$$\hat{S}[q,t]=A^{-1}[q]X[q,t] \quad \text{Equation 32}$$

Here the proper component is the first one. We thus have in a compact form:

$$\hat{E}_{MINV}[q,t]=[\text{Fist component}\{A^{-1}[q]X[q,t]\}]_{slice} \quad \text{Equation 33}$$

The matrix A[q] can be estimated in a supervised, semi-blind or full blind mode, as usual. The blind step involves a decision directed approach.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A telecommunication system having reduced crosstalk comprising:
   a modem disposed at a customer premises;
   a local loop terminating at the customer premises and connected to the modem, the local loop for carrying modem communications;
   a first circuit disposed to sense the signal received on the local loop;
   a second circuit configured to obtain a common mode signal from the local loop; and
   a processor circuit disposed within the modem, the processor configured to reduce crosstalk on the local loop through computations based upon both the signal received on the local loop and the common mode signal, wherein the processor circuit is configured to process a signal that takes in the time domain, after digitization, the following forms:

$p[n]=(f \otimes u)[n]+(l \otimes e)[n]+w[n]$, common mode signal and $r[n]=(h \otimes e)[n]+(g \otimes u)[n]+v[n]$, differential mode signal, where w[n] and v[n] are independent white noise quantities, r[n] is the signal received on the local loop, p[n] is the common mode signal, h[n] is an impulse response of the first local loop, l[n] is a cross-coupling measure between the local loop and the common mode, u[n] is a signal carried on a disturber line, f[n] is a cross-coupling measure between the disturber line and the common mode signal, e[n] is the signal transmitted from a remote transmitter on the local loop, g[n] is a cross-coupling measure between the disturber line and the local loop, and wherein the $\otimes$ symbol represents a convolution operation.

2. The system of claim 1, wherein the processor circuit is more specifically configured to cancel near-end(NEXT) crosstalk.

3. The system of claim 1, wherein the telecommunication system is a digital subscriber line (DSL) system and the modem is a DSL modem.

4. The system of claim 1, wherein the processor is configured to approximate the first equation of claim 1 to be:

$p[n]=(f \otimes u)[n]+w[n]$ by assuming that the far-end crosstalk(FEXT) term $(l \otimes e)[n]$ is less than one one-hundredth of the near-end crosstalk (NEXT) term $(f \otimes u)[n]$.

5. The system of claim 1, wherein the processor is configured to utilize source separation methods for computing the equations of claim 1.

6. The system of claim 5, wherein the source separation methods include using a blind source separation mathematical technique.

7. The system of claim 5, wherein the source separation methods include using a semi-blind source separation mathematical technique.

8. The system of claim 4, wherein the processor is configured to approximate the second equation of claim 1 to be:

$r[n]=(h \otimes e)[n]+(\xi \otimes p)[n]+\eta[n]$ where $\xi[n]$ denotes an equivalent coupling, and $\eta[n]$ denotes a white noise.

9. The system of claim 8, wherein the processor is further configured to compute $\xi[n]$ during a silent phase where e[n]=0, since p[n] and e[n] are substantially uncorrelated.

10. The system of claim 8, wherein the processor is further configured to compute $\xi[n]$ using a minimum means square deconvolution method.

11. The system of claim 8, wherein the processor is further configured to compute $\xi[n]$ using an adaptive filtering method.

12. The system of claim 1, wherein the processor is implemented in circuitry.

13. The system of claim 12, wherein the processor circuitry includes hardware.

14. The system of claim 12, wherein the processor circuitry includes software.

15. The system of claim 12, wherein the processor circuitry includes a combination of hardware and software.

16. The system of claim 12, wherein the processor circuitry includes firmware, micro-coded into hardware.

17. In a telecommunications system having a local loop terminating at a customer premises, a method of reducing crosstalk on the local loop comprising the steps of:
   sensing a first signal received on the local loop;
   obtaining a common mode signal from the local loop;
   using the first signal and the common mode signal to compute a measure of crosstalk present on the first local loop, wherein the step of using the first signal and the common mode signal to compute a measure of crosstalk includes processing equations for signals in the following form:

$p[n]=(f \otimes u)[n]+(l \otimes e)[n]+w[n]$, and $r[n]=(h \otimes e)[n]+(g \otimes u)[n]+v[n]$, where w[n] and v[n] are independent white noise quantities, r[n] is the signal received on the local loop, p[n] is the common mode signal, h[n] is an impulse response of the first local loop, l[n] is a cross-coupling measure between the local loop and the common mode, u[n] represents at least one signal carried on a disturber line, f[n] is a cross-coupling measure between the disturber line and the common mode signal, e[n] is the signal transmitted from a remote transmitter on the local loop, g[n] is a cross-coupling measure between the disturber line and the local loop, and wherein the $\otimes$ symbol represents a convolution operation; and subtracting the measure of crosstalk from the first signal.

18. The method of claim 17, wherein the processor is configured to approximate the first equation of claim 17 to be:

$$p[n]=(f \otimes u)[n]+w[n]$$

by assuming that the far-end crosstalk(FEXT) term $(l \otimes e)[n]$ is less than one one-hundredth of the near-end crosstalk (NEXT) term $(f \otimes u)[n]$.

19. The method of claim 17, wherein the step of solving the equation further includes the step of assuming that the far-end crosstalk(FEXT) $(l \otimes e)[n]$ term is not less than one one-hundredth of the near-end crosstalk(NEXT) $(f \otimes u)[n]$ term, and that source separation methods are utilized for computing the equations of claim 17.

20. The method of claim 19, wherein the source separation methods include using a blind source separation mathematical technique.

21. The method of claim 19, wherein the source separation methods include using a semi-blind source separation mathematical technique.

22. The method of claim 18, wherein the step of solving the equations further includes approximating the second equation of claim 17 to be:

$$r[n]=(h \otimes e)[n]+(\xi \otimes p)[n]+\eta[n]$$

where $\xi[n]$ denotes an equivalent coupling, and $\eta[n]$ denotes a white noise.

23. The method of claim 22, wherein the step of solving the equations further includes computing $\xi[n]$ during a silent phase where e[n]=0, since p[n] and e[n] are substantially uncorrelated.

24. The method of claim 22, wherein the step of solving the equations further includes computing $\xi[n]$ using a minimum means square deconvolution method.

25. The method of claim 22, wherein the step of solving the equations further includes computing $\xi[n]$ using an adaptive filtering method.

26. In a telecommunications system having a local loop terminating at a customer premises, a method of reducing the effects of crosstalk on the local loop comprising the steps of:

sensing a first signal received on the local loop;
obtaining a common mode signal from the local loop;
computing a Discrete Fourier Transform of both the first signal and the common mode signal;
using both the first signal and the common mode signal to compute a transmitted signal, wherein the step of using the first signal and the common mode signal to compute a measure of crosstalk includes solving equations in the following form:

$$\begin{cases} X^{(0)}[q,t] = H^{(0)}[q]E[q,t] + V^{(0)}[q,t] \\ X^{(1)}[q,t] = H^{(1)}[q]E[q,t] + V^{(1)}[q,t] \end{cases}, \quad \text{Equation 20}$$

$q$ is the bin rank, and $t$ is the time symbol index q is the bin rank, and t is the time symbol index where E[q, t] is the emitted complex constellation point for the bin q and the symbol t, the superscript $^{(i)}$, $0 \leq i \leq 1$, refers to the path, $V^{(i)}[q, t]$ stands for the whole perturbation of bin q of symbol t on path i, i.e. crosstalk and the Additive White Gaussian Noise(AWGN) gain per bin q, on path i.

27. The method of claim 26, wherein the step of using the first signal and the common mode signal to compute a transmitted signal includes using a covariance matrix and statistical probabilities to approximate the transmitted signal.

28. In a customer premises, a modem having improved crosstalk cancellation circuitry for canceling crosstalk received on a local loop carrying modem communications comprising:

a first input for receiving a signal carried on the local loop;
a second input for receiving a common mode signal obtained from the local loop;
logic for computing a Discrete Fourier Transform of both the first signal and the common mode signal;
processing circuitry configured to reduce crosstalk present in the signal carried on the first local loop through computations based upon the signals carried on both the first signal and the common mode signal, wherein the processor circuit is configured to compute equations in the following form:

$$\begin{cases} X^{(0)}[q,t] = H^{(0)}[q]E[q,t] + V^{(0)}[q,t] \\ X^{(1)}[q,t] = H^{(1)}[q]E[q,t] + V^{(1)}[q,t] \end{cases}, \quad \text{Equation 20}$$

$q$ is the bin rank, and $t$ is the time symbol index q is the bin rank, and t is the time symbol index where E[q, t] is the emitted complex constellation point for the bin q and the symbol t, the superscript $^{(i)}$, $0 \leq i \leq 1$, refers to the path, $V^{(i)}[q, t]$ stands for the whole perturbation of bin Q of symbol t on path i, i.e. crosstalk and the Additive White Gaussian Noise(AWGN) gain per bin q, on path i.

29. The modem of claim 28, wherein the signal carried on the local loop is a digital subscriber line (DSL) signal.

* * * * *